US00RE47289E

(19) United States
(12) Reissued Patent
Lai et al.

(10) Patent Number: US RE47,289 E
(45) Date of Reissued Patent: Mar. 12, 2019

(54) SERVER SYSTEM AND OPERATION METHOD THEREOF

(71) Applicant: Quanta Computer Inc., Taoyuan (TW)

(72) Inventors: Te-Hsien Lai, Banciao (TW); Yu-Cheng Chen, Taoyuan (TW); Ching-Fu Kung, Guishan Township (TW)

(73) Assignee: QUANTA COMPUTER INC., Taoyuan (TW)

(21) Appl. No.: 14/703,207

(22) Filed: May 4, 2015

Related U.S. Patent Documents

Reissue of:
(64) Patent No.: 8,452,863
Issued: May 28, 2013
Appl. No.: 12/960,103
Filed: Dec. 3, 2010

(30) Foreign Application Priority Data

Jul. 23, 2010 (TW) ..... 99124360 A

(51) Int. Cl.
*G06F 9/46* (2006.01)
*G06F 11/30* (2006.01)
*H04L 29/08* (2006.01)

(52) U.S. Cl.
CPC .... *G06F 11/3055* (2013.01); *H04L 29/08072* (2013.01); *G06F 9/46* (2013.01)

(58) Field of Classification Search
CPC ... G06F 11/3055; G06F 9/46; H04L 29/08072
See application file for complete search history.

(56) References Cited

U.S. PATENT DOCUMENTS 6,496,790 B1 * 12/2002 Kathavate ..... G01R 31/317 702/188
2003/0130969 A1 * 7/2003 Hawkins et al. ..... 706/15
2007/0055793 A1 * 3/2007 Huang ..... G06F 13/102 710/8
2007/0180449 A1 * 8/2007 Croft et al. ..... 718/1
2007/0233833 A1 * 10/2007 Wang ..... 709/223

(Continued)

*Primary Examiner* — Eron J Sorrell
(74) *Attorney, Agent, or Firm* — Nixon Peabody LLP; Eduardo J. Quiñones; Zhou Lu

(57) ABSTRACT

An operation method for a server system includes[: (A)] under control of a hardware abstraction layer (HAL), a plurality of node management units sharing a hardware resource[; (B) if] *If* one of the node management units needs to use the hardware resource, *the method includes* the node management unit sending an instruction or a data to the HAL and accordingly the HAL using the hardware resource in represent of the node management unit[; and (C) if]. *If* an external instruction is received, *the method includes* the HAL identifying which transmission port of the hardware resource receives the external instruction, so to send the external instruction to a corresponding node management unit[, and]. *Then,* after the external instruction is executed, *the method includes* the corresponding node management unit sending back an information to the HAL so that the HAL sends back the information to an external system administrator.

14 Claims, 4 Drawing Sheets

(56) References Cited

U.S. PATENT DOCUMENTS

| | | | | |
|---|---|---|---|---|
| 2008/0276082 | A1* | 11/2008 | Culley | G06F 1/189 713/2 |
| 2008/0307502 | A1* | 12/2008 | Hung | G06F 21/82 726/4 |
| 2009/0125901 | A1* | 5/2009 | Swanson | G06F 9/45558 718/1 |
| 2009/0260081 | A1* | 10/2009 | Johnson | G06F 21/552 726/22 |
| 2011/0255538 | A1* | 10/2011 | Srinivasan | H04L 41/0893 370/392 |
| 2011/0273833 | A1* | 11/2011 | Zhang | G06T 1/20 361/679.32 |

* cited by examiner

SERVER SYSTEM AND OPERATION METHOD THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application claims the benefit of Taiwan application Serial No. 99124360, filed Jul. 23, 2010, the subject matter of which is incorporated herein by reference.

BACKGROUND OF THE INVENTION

1. Field of the Invention

The invention relates in general to a server system and an operation method thereof.

2. Description of the Related Art

The blade server has been widely used in many fields of application. In general, several blade servers are assembled in a chassis system so as to provide operation convenience for the user. The blade server clusters together the core computing circuits of all server systems in a server station. The system administrator maintains and controls the server systems and the network of the server station, so that the system administrator can maintain and control the computer server systems clustered together.

Currently, the server manages nodes according to the intelligent platform management interface (IPMI) protocol, and a baseboard management controller (BMC) is used for monitoring the node, recording the events and recovering the system error. The node refers to a computing unit with independent computing ability. The node at least includes a central processing unit (CPU) and a memory. For the products currently available in the market, one single BMC can only manage one single node but not manage a plurality of nodes concurrently. The chassis system has a hardware chassis management module (CMM) for managing the entire chassis system.

Since the demand for data center increases along with the development of cloud technology, how to accommodate more nodes within a limited space to increase the computing ability has become an imminent task to the IT industry.

Examples of the invention disclose a server system and an operation method thereof capable of reducing the number of BMC chips for increasing the internal space of the server so that more nodes can be disposed and the cost can be reduced.

SUMMARY OF THE INVENTION

Examples of the invention are directed to a server system and an operation method thereof. Through a hardware abstraction layer (HAL), a plurality of node management units (realized by software and respectively used for managing a node) of the BMC can share the hardware resource of the BMC.

According to an embodiment of the present invention, provided is a server system including at least a system board comprising a baseboard management controller and a plurality of nodes, wherein the baseboard management controller comprises a plurality of node management units, a hardware abstraction layer (HAL) and a hardware resource, and the node management units respectively manage the nodes and share the hardware resource under the control of the HAL; a connection port used for connecting to an external system administrator; and an internal channel connected to the system board and the connection port.

According to another embodiment of the present invention, provided is an operation method for a server system comprising at least a system board, the system board comprising a baseboard management controller and a plurality of nodes, the baseboard management controller comprising a plurality of node management units, an HAL and a hardware resource, the node management units respectively managing the nodes, the operation method comprising: (A) sharing the hardware resource by the node management units under the control of the HAL; (B) transmitting an instruction or a data to the HAL by the node management unit when one of the node management units needs to use the hardware resource, wherein the HAL uses the hardware resource on behalf of the node management unit; and (C) if an external instruction is received, the HAL identifying which transmission port of the hardware resource receives the external instruction and transmitting the external instruction to the corresponding node management unit and after the external instruction is executed, the corresponding node management unit transmitting an information to the HAL and the HAL further transmits the information to an external system administrator via the transmission port.

The above and other aspects of the invention will become better understood with regard to the following detailed description of the preferred but non-limiting embodiment(s). The following description is made with reference to the accompanying drawings.

DETAILED DESCRIPTION OF THE INVENTION

In an embodiment of the invention, one single BMC can manage a plurality of nodes. By use of a hardware abstraction layer (HAL), the BMC is expanded from single-node management to multi-node management and is still conformed to the IPMI protocol. Thus, the number of BMC chips used in the chassis system is reduced, not only reducing the cost but also saving the space and lowering the internal temperature of the chassis system.

Figure 1:
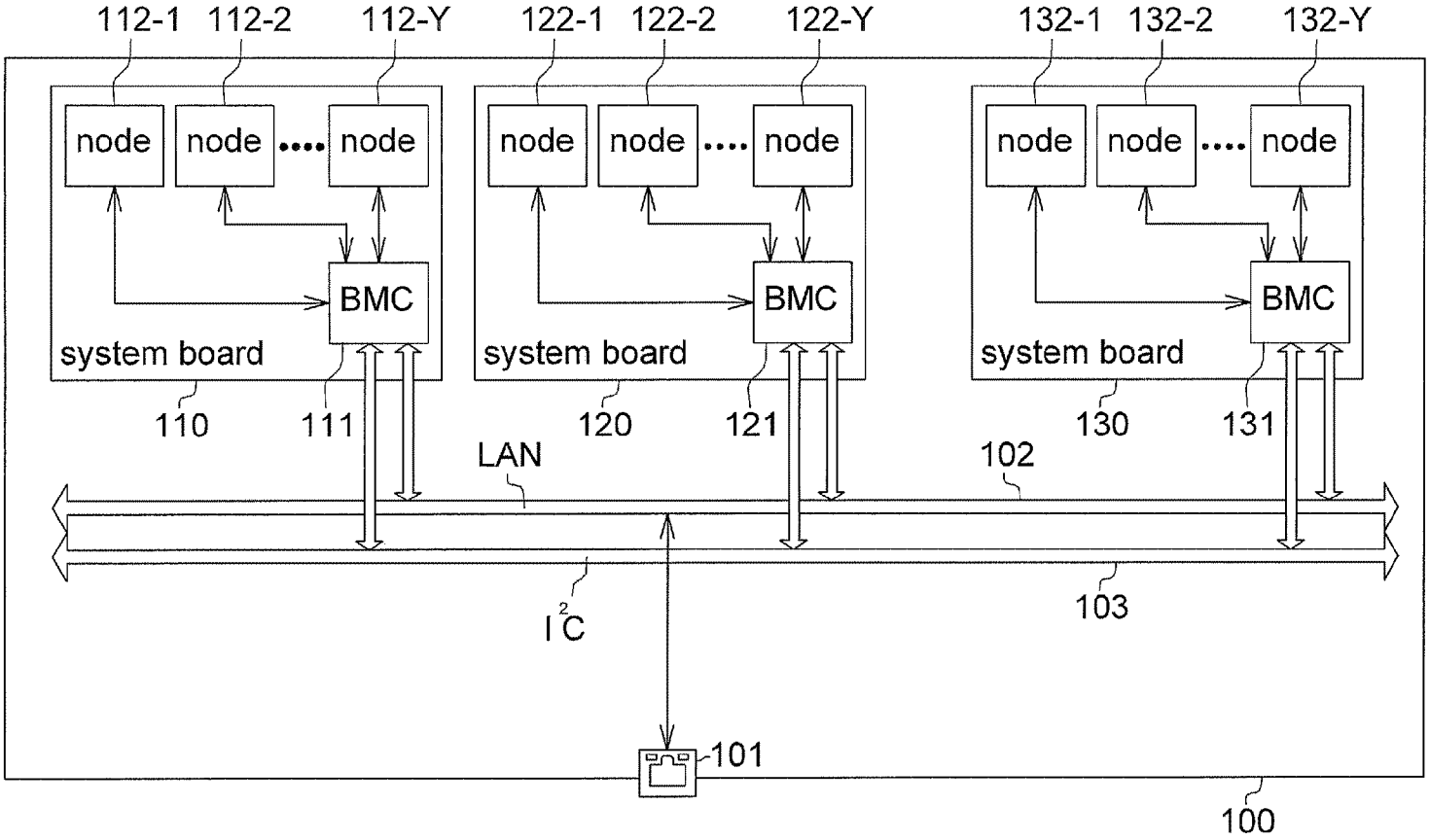
FIG. 1 shows a chassis system according to an embodiment of the invention.

FIG. 1 shows a chassis system according to the embodiment of the invention. As indicated in FIG. 1, the chassis system 100 at least includes a connection port 101, a local area network (LAN) 102, an inter-integrated circuit ($I^2C$) bus 103, and a plurality of system boards. Although in FIG. 1, the chassis system 100 includes three system boards 110~130, but the embodiment of the invention is not limited thereto. The system board 110 includes a BMC 111 and nodes 112-1~112-Y, the system board 120 includes a BMC 121 and nodes 122-1~122-Y, and the system board 130 includes a BMC 131 and node 132-1~132-Y, wherein Y is a positive integer.

The instruction and the signal from the system administrator are further transmitted to the corresponding system board through the connection port 101. Also, the information from the system board is transmitted to the system administrator through the connection port 101.

As indicated in FIG. 1, the LAN 102 and the $I^2C$ bus 103 provide a communication path between the BMCs of the system boards. In other embodiment of the invention, the BMC selectively has a chassis management module (CMM).

Figure 2:
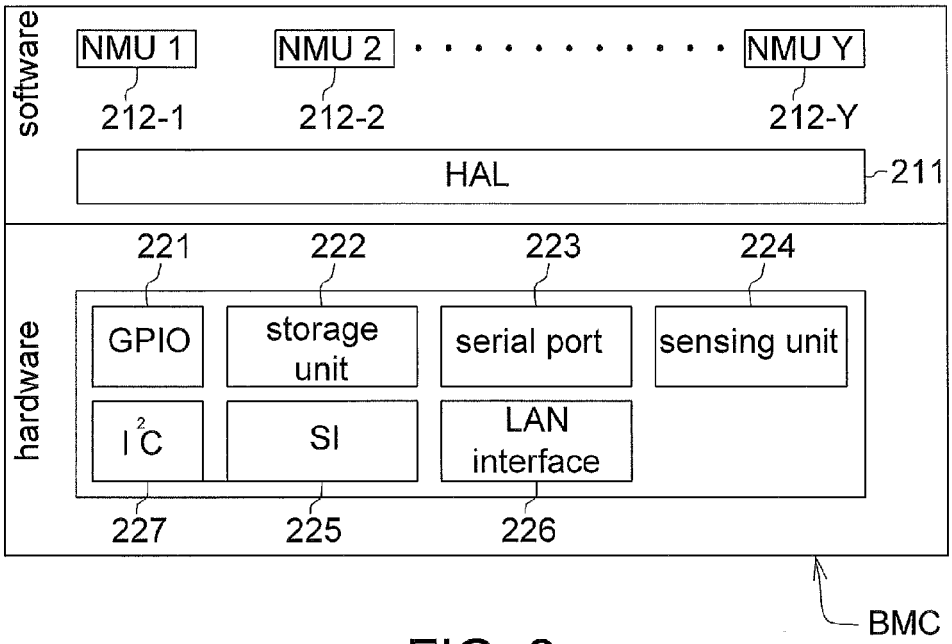
FIG. 2 shows a BMC according to the embodiment of the invention.

FIG. 2 shows the BMC according to the embodiment of the invention. As indicated in FIG. 2, the BMC includes a hardware portion and a software portion. The software portion includes an HAL 211 and node management units (NMU) 212-1~212-Y, and the hardware portion includes a general purpose input/output (GPIO) pin 221, a storage unit 222, a serial port 223, a sensing unit 224, a system interface (SI) 225, a LAN interface 226 and an $I^2C$ interface 227.

For each node, the BMC accesses the reading of the sensing unit 224 so as to monitor physical parameters (such as CPU temperature, memory temperature, and voltage) of the node. For example, the BMC may have three CPU temperature sensors for sensing the CPU temperatures of three nodes respectively. Moreover, the BMC controls the ON/OFF state of the system through the GPIO pin 221. In addition, the system administrator may transmit an IPMI instruction to the BMC through the LAN interface 226 or the system interface 225, for requesting the BMC to execute the IPMI instruction transmitted thereto.

The NMU is a management software unit conformed to the IPMI protocol. That is, in terms of the BMC 111, the NMU 1~NMU 3 respectively manage the nodes 112-1~112-3. Since one single BMC manages a plurality of nodes, a plurality of NMUs must share the hardware portion of the BMC. Thus, the hardware abstraction layer (HAL) 211 is used to resolve the above issue. For each NMU, the HAL 211 establishes a respective logic (virtual) hardware device mapped to physical hardware device(s).

Figure 3:
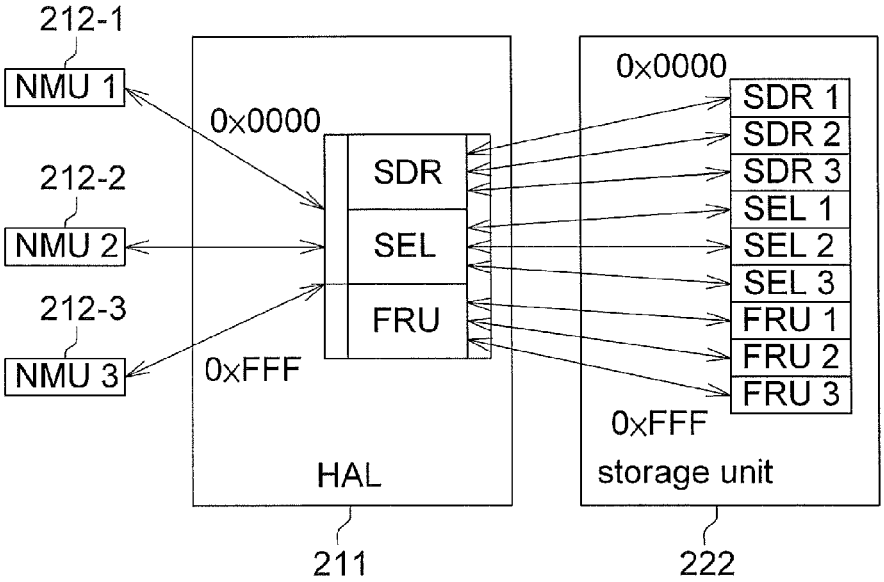
FIG. 3 shows how a plurality of NMU share the hardware portion of the BMC through an HAL according to the embodiment of the invention.

FIG. 3 shows how a plurality of NMU shares the hardware portion of the BMC through the HAL according to the embodiment of the invention. As indicated in FIG. 3, when the NMU needs to accesses a sensor data record (SDR), the NMU does not needs to know the physical access address of the SDR of the node in the storage unit 222. When the NMU needs to read the SDR data, the NMU informs the HAL 211 which SDR data (such as the CPU temperature, the memory temperature, and the applying voltage) of the node the NMU needs and the HAL 211 transmits the SDR data of the corresponding node to the NMU. SDR1~SDR3 respectively denote the SDR data of the nodes 1~3, which respectively correspond to the NMU1~NMU3.

Similarly, when the NMU needs to store the SDR data, the NMU does not need to know the physical storage address of the SDR of the node in the storage unit 222. When the NMU needs to store the SDR data, the NMU transmits the to-be-stored SDR data to the HAL 211 which accordingly stores the SDR data to the storage unit 222. That is, the HAL 211 maps data to be accessed or stored by the NMU to the storage unit 222.

A system event log (SEL) is used for storing the events (such as system abnormality) of the node. Similarly, when the NMU 1~NMU 3 need to access SEL 1~SEL 3, the HAL 211 accesses the storage unit 222 like the above disclosure. A field replaceable unit (FRU) is used for recording system information such as the number of the system board and the product name. Similarly, when the NMU 1~NMU 3 need to access the FRU 1~FRU 3, the HAL 211 accesses the storage unit 222 like the above disclosure. Furthermore, data map by the HAL 211 is not limited to SDR, SEL and FRU. Other functions in the IPMI protocol, such as serial over LAN (SOL), platform event filter (PEF), sensor monitor and chassis control etc can be mapped or transmitted by the NMU through the HAL.

Figure 4A:
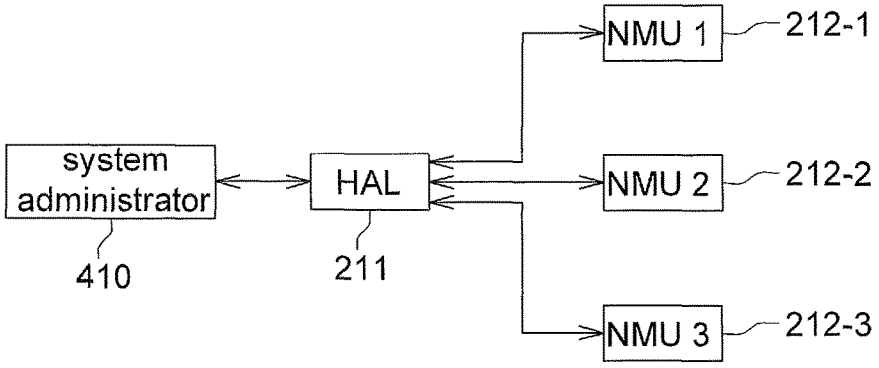
FIG. 4A~FIG. 4C show the transmission of instruction/information through the HAL according to the embodiment of the invention.
Figure 4B:
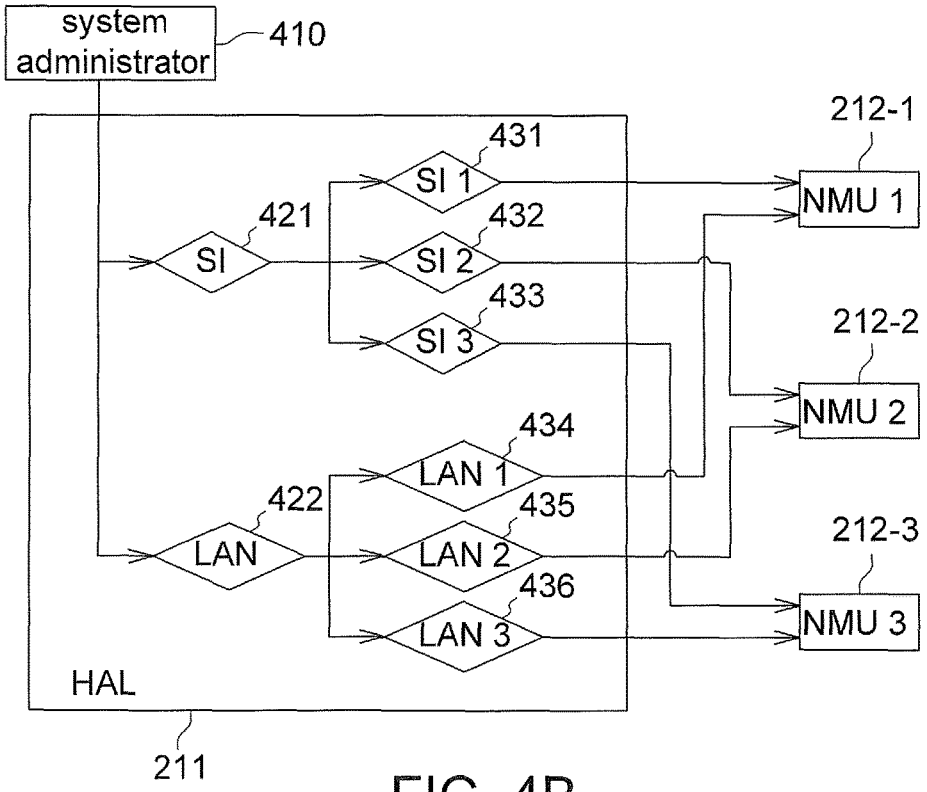
Figure 4C:
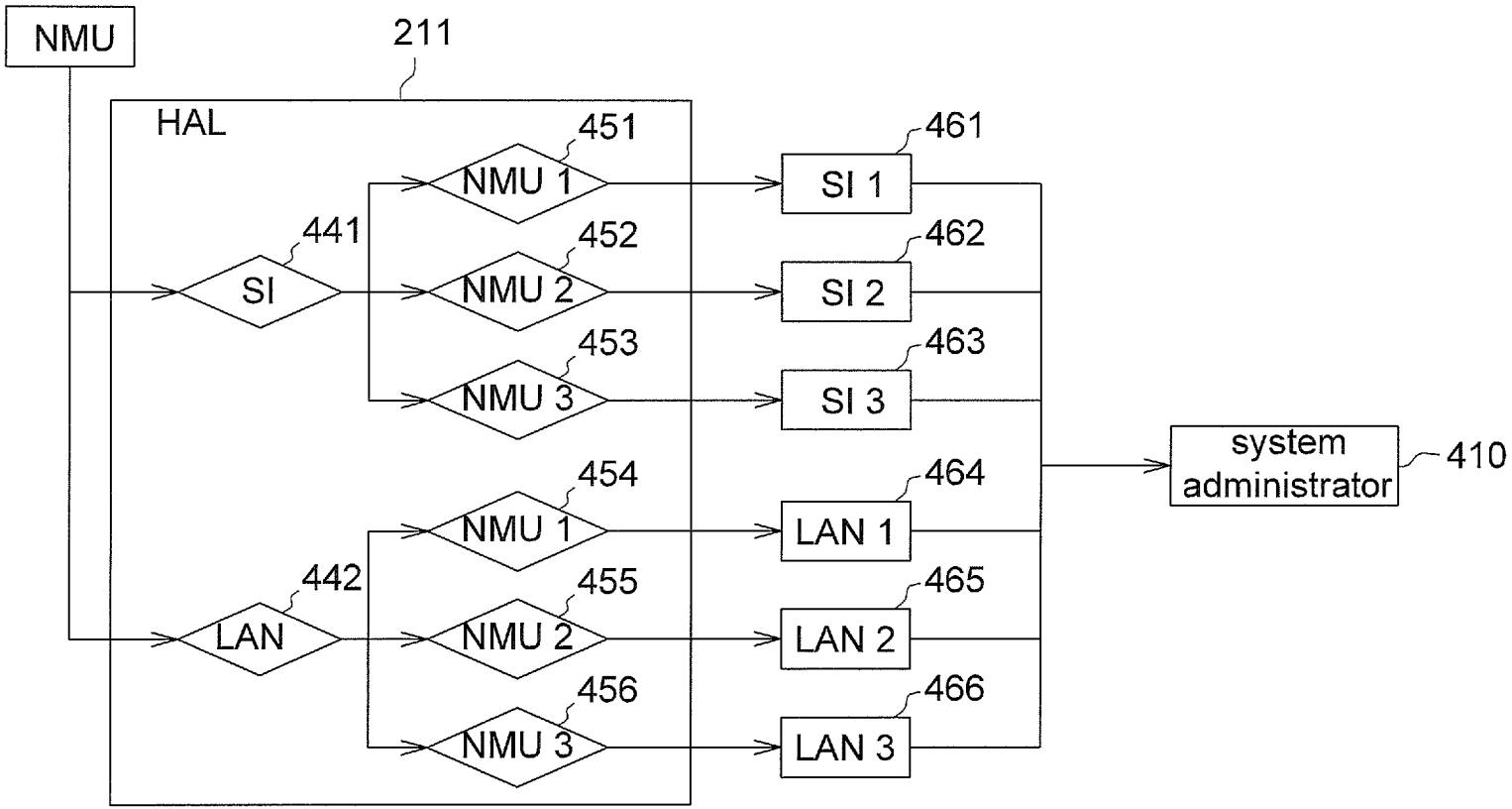

FIG. 4A~FIG. 4C show the transmission of instruction/information through the HAL according to the embodiment of the invention. As indicated in FIG. 4A, the communication between the system administrator 410 and the HAL 211 is bi-directional, and so is the communication between the HAL 211 and the NMU.

FIG. 4B shows the system administrator 410 transmitting an IPMI instruction to the BMC through the HAL 211. As indicated in FIG. 4B, the system administrator 410 transmits an IPMI instruction to the HAL 211. Then, the HAL 211 judges whether the IPMI instruction is transmitted through a system interface (SI) (as indicated in step 421) or through an LAN interface (as indicated in step 422). If the IPMI instruction is transmitted through the SI, then the HAL 211 judges whether the IPMI instruction is transmitted through the first transmission port SI 1 (which is corresponding to the node 1) of the SI, the second transmission port SI 2 (which is corresponding to the node 2) of the SI or the third transmission port SI 3 (which is corresponding to the node 3) of the SI, as indicated in step 431~433. In the present embodiment of the invention, the system interface of the BMC has a plurality of SI transmission ports, and three SI transmission ports are used for connecting the BMC to the system administrator 410. If the IPMI instruction is transmitted through the LAN interface, then the HAL 211 judges whether the IPMI is transmitted through the first transmission port LAN 1 (which is corresponding to the node 1) of the LAN interface, the second transmission port LAN 2 (which is corresponding to the node 2) of the LAN interface or the third transmission port LAN 3 (which is corresponding to the node 3) of the LAN interface, as indicated in step 434~436. In the present embodiment of the invention, the LAN interface of the BMC has a plurality of LAN transmission ports, and three LAN transmission ports are used for connecting the BMC to the system administrator 410. After the judgment steps 431~436, the HAL determines which of the NMU 1~NMU 3 should the IPMI instruction from the system administrator 410 be transmitted to, and the HAL 211 accordingly transmits the IPMI instruction to the target NMU.

FIG. 4C shows the BMC transmits information to the system administrator 410 through the HAL 211. After the NMU receives the IPMI instruction from the system administrator 410, the NMU performs corresponding operation, and then transmits the response information back to the system administrator 410 through the HAL 211. As indicated in FIG. 4C, the NMU transmits the response information to the HAL 211. Next, the HAL 211 judges whether the response information is received through the system interface (SI) (as indicated in step 441) or the LAN interface (as indicated in step 442). If the response information is received through the system interface, then the HAL 211 analyzes the received response information, and identifies which NMU issues the response information (steps 451~453 and steps 454~456). In the present embodiment of the invention, the system interface of the BMC has a plurality of SI transmission ports, and three SI transmission ports are used for connecting the system administrator 410 to the BMC. The LAN interface of the BMC has a plurality of LAN transmission port, and three LAN transmission ports are used for connecting the system administrator 410 to the BMC. The HAL 211 judges whether the response information is transmitted through the system interface, and then further identifies which NMU issues the response information (steps 451~453). Thus, the HAL 211 can transmit the response information back to the system administrator 410 through the interface (such as SI) which originally receives the information (step 461~463). Similarly, HAL 211 judges whether the NMU transmits the response information through the LAN interface, and then identifies which NMU issues the response information (steps 454~456), thus the response information is transmitted back to the system administrator 410 through the interface (LAN interface) which originally receives the information (steps 464~466).

In the embodiment of the invention, when the system administrator 410 sends the IPMI instruction to the BMC through the LAN interface or the system interface, the HAL 211 identifies which transmission port receives the IPMI instruction, and transmits the instruction to a corresponding NMU. After the instruction is executed by the NMU, the NMU transmits the information back to the HAL 211, which accordingly transmits the response information back to the system administrator 410 through the original transmission port. However, the embodiment of the invention is not subjected to the above exemplification that the HAL 211 has to transmit the IPMI instruction through the LAN interface or the system interface. In other embodiments of the invention, the HAL 211 can also transmit the IPMI instruction through other interface supported by the IPMI protocol.

To summarize, the embodiment of the invention has at least the following advantages. (1) The number of BMC chips in a high-density server (such as a blade server) is reduced, so that the cost is reduced accordingly. (2) Space is utilized more effectively, the number of nodes and computing ability of the server are higher, and system temperature is lowered (due to the decrease in the number of BMC chips).

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A server system, comprising:

at least a system board comprising a baseboard management controller and a plurality of nodes, wherein the baseboard management controller comprises a plurality of node management units, a hardware abstraction layer (HAL) and a hardware resource, and the node management units respectively manage the nodes and share the hardware resource under the control of the HAL;

a connection port used for connecting to an external system administrator; and an internal channel connected to the system board and the connection port;

the at least a system board further comprising a plurality of transmission ports, the baseboard management controller being connected to the external system administrator via the transmission ports, wherein

[if] *after* an external instruction is transmitted to the baseboard management controller through the hardware resource, [then] the HAL identifies which transmission port receives the external instruction and transmits the external instruction to the corresponding node management unit, and after the corresponding node management unit executes the external instruction, the corresponding node management unit transmits an information to the HAL for transmitting the information back to the external system administrator via the transmission port.

2. The server system according to claim 1, wherein for each node management unit, the HAL establishes a logic hardware device mapped to the hardware resource.

3. The server system according to claim 2, wherein if one of the node management units needs to use the hardware resource, the node management unit transmits an instruction to the HAL and the HAL accesses the hardware resource according to the instruction and transmits a result to the node management unit.

4. The server system according to claim 2, wherein when one of the node management units needs to use the hardware resource, the node management unit transmits a data to the HAL and the HAL accesses the hardware resource according to the data.

5. An operation method for a server system comprising at least a system board, the system board comprising a baseboard management controller and a plurality of nodes, the baseboard management controller comprising a plurality of node management units, a hardware abstraction layer (HAL) and a hardware resource, the node management units respectively managing the nodes, the operation method comprising:

(A) sharing the hardware resource by the node management units under the control of the HAL;

(B) transmitting an instruction to the HAL by the node management unit when one of the node management units needs to use the hardware resource, wherein the HAL uses the hardware resource on behalf of the node management unit, accesses the hardware resource according to the instruction and transmits a result to the node management unit; and (C) [if] *after* an external instruction is received, the HAL [identifying] *identifies* which transmission port of the hardware resource receives the external instruction and [transmitting] *transmits* the external instruction to the corresponding node management unit and, after the external instruction is executed, the corresponding node management unit [transmitting] *transmits* an information to the HAL and the HAL further transmits the information to an external system administrator via the transmission port.

6. The operation method according to claim 5, wherein, the step (A) comprises:

for each node management unit, establishing a logic hardware device mapped to the hardware resource by the HAL.

*7. The server system according to claim 2, wherein when one of the node management units needs to use the hardware resource, the node management unit transmits a data to the HAL and the HAL accesses the hardware resource according to the data.*

*8. The server system according to claim 1, wherein the HAL identifies which one of the plurality of transmission ports received the external instruction.*

*9. The server system according to claim 1, wherein the external instruction is transmitted to the baseboard management controller through the hardware resource.*

*10. The server system according to claim 1, wherein the server system comprises at least three system boards.*

*11. The operation method according to claim 6, wherein when one of the node management units needs to use the hardware resource, the node management unit transmits an instruction to the HAL and the HAL accesses the hardware resource according to the instruction and transmits a result to the node management unit.*

*12. The operation method according to claim 6, wherein when one of the node management units needs to use the hardware resource, the node management unit transmits a data to the HAL and the HAL accesses the hardware resource according to the data.*

*13. The operation method according to claim 5, wherein the information comprises response information regarding execution of the eternal instruction.*

*14. The operation method according to claim 5, wherein the server system comprises at least three system boards.*

* * * * *